Figure 1:
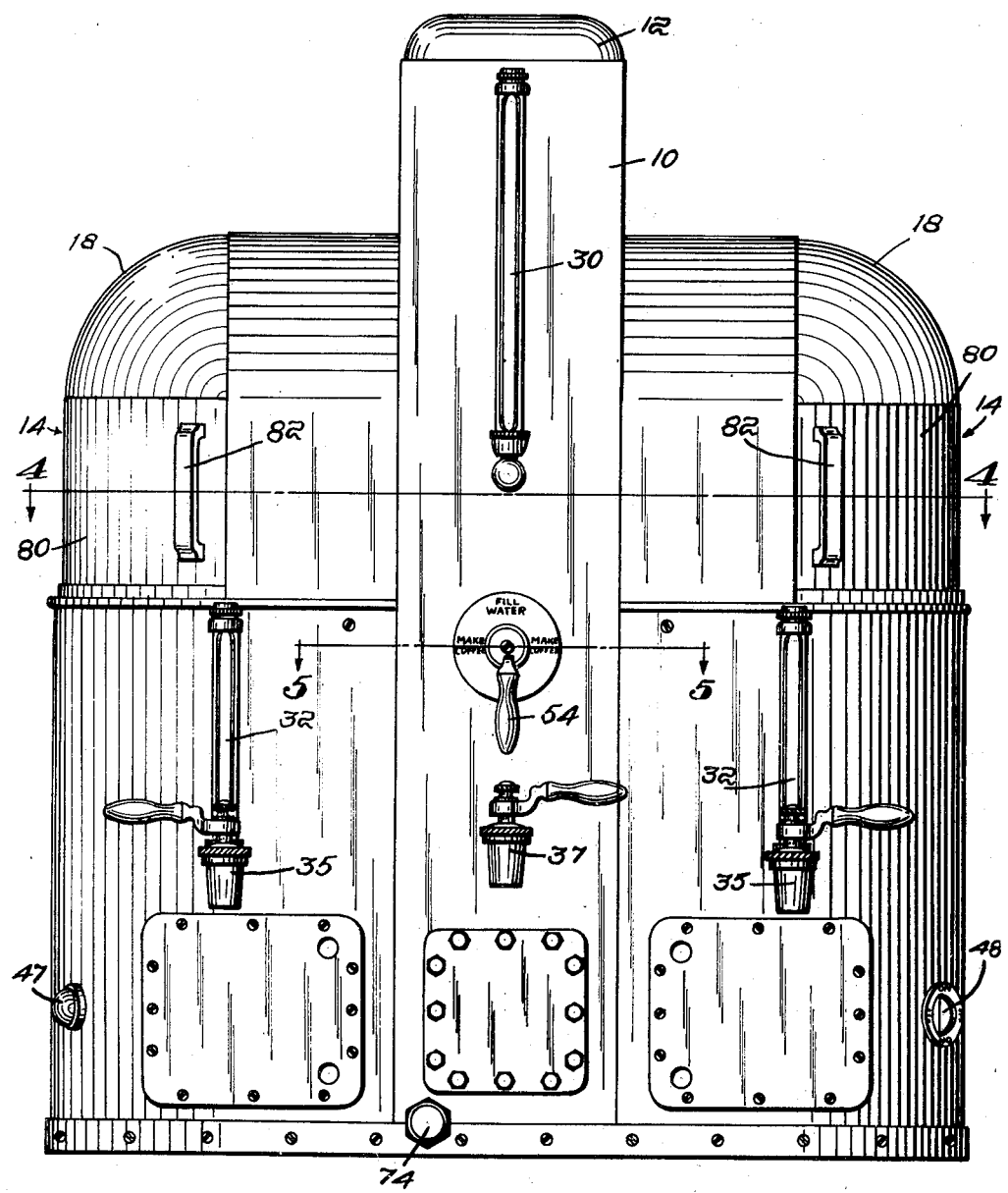

Dec. 6, 1949     R. C. ASHENDEN, JR     2,490,501
COFFEE MAKING APPARATUS

Filed Feb. 21, 1945     4 Sheets-Sheet 1

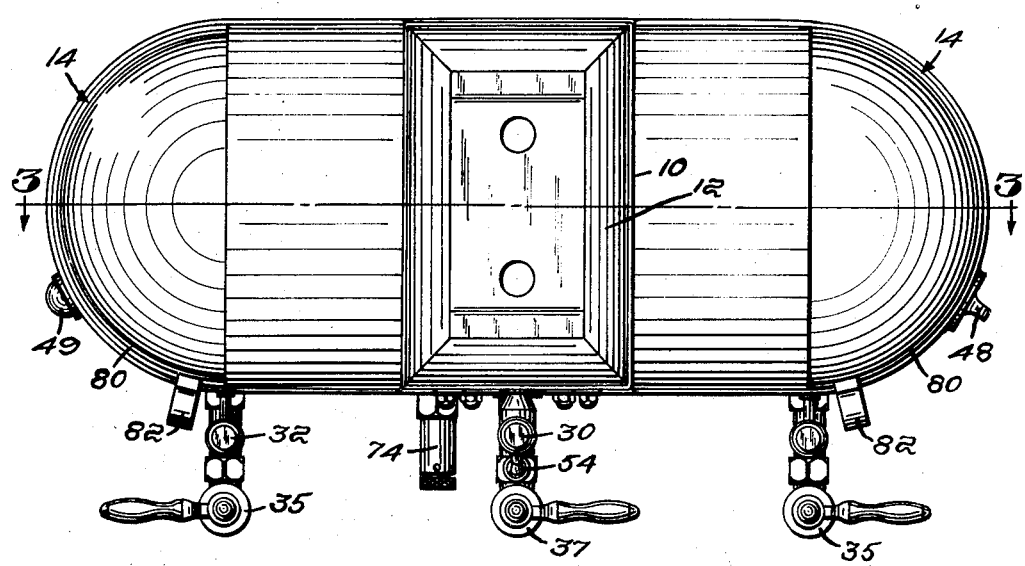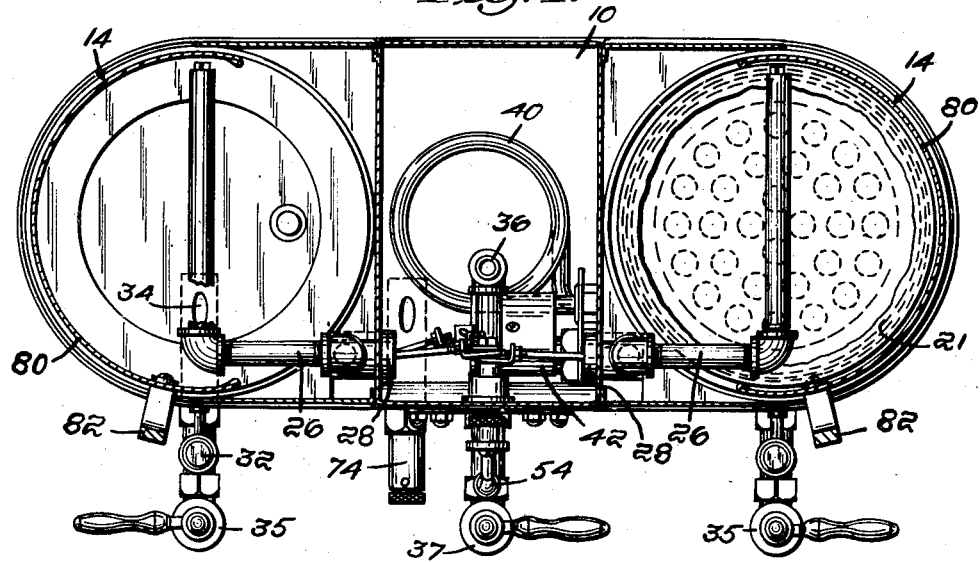

Dec. 6, 1949  R. C. ASHENDEN, JR  2,490,501
COFFEE MAKING APPARATUS
Filed Feb. 21, 1945  4 Sheets-Sheet 3

Inventor:
Richard C. Ashenden, Jr.
by Henway & Witter
Attorneys

Dec. 6, 1949 R. C. ASHENDEN, JR 2,490,501
COFFEE MAKING APPARATUS
Filed Feb. 21, 1945 4 Sheets-Sheet 4

Inventor:
Richard C. Ashenden Jr.
by Munway & Witter
Attorneys

Patented Dec. 6, 1949

2,490,501

UNITED STATES PATENT OFFICE 2,490,501

COFFEE-MAKING APPARATUS

Richard C. Ashenden, Jr., Winchester, Mass.

Application February 21, 1945, Serial No. 579,024

2 Claims. (Cl. 99—291)

This invention relates to apparatus for restaurant and hotel service where it is desired to keep on hand a copious supply of hot coffee, or other beverage and to prepare large amounts on short notice.

The primary object of the invention is to provide apparatus of compact self-contained construction, fully automatic in respect to temperature control, and operating by gravity as distinguished from pressure derived from boiling water. Apparatus of the pressure type heretofore used has several disadvantages. In the first place it must be heavily built to withstand steam pressure, it is constantly subjected to strain which may result in leakage, and it is difficult to clean since it must be set up everywhere with steam-tight joints which are inconsistent with easily removable covers.

All these difficulties are avoided in the apparatus of my invention which includes in its organization a vertically disposed water supply reservoir containing a heating unit and extending substantially above the coffee brewing chamber of one or more urns. The reservoir may be filled by connection with a service water main having suitable valve control to contain a measured amount of hot water above the level of the coffee brewing chamber or chambers. This measured amount of water may be discharged by gravity into the coffee brewing chamber from whence it flows by gravity into a heated reservoir for the beverage. Preferably and as herein shown a single operating handle is so connected to controlling valves as to control the supply of water to the water supply reservoir and its discharge to any selected coffee brewing chamber.

By moving the operating handle to one position the reservoir can be filled to an extent placing a predetermined amount of water in the reservoir above the coffee brewing chamber and by moving the handle to other positions this measured quantity of water can be discharged by gravity in the form of a spray to the desired coffee brewing chamber. The water reservoir and each of the beverage reservoirs is provided with a heating unit and a thermostat operating to cut out the heating unit should the liquid within the reservoir fall below a predetermined safe level.

The production of a compact, stream-line coffee brewing apparatus of this nature, including a single water reservoir and means for flowing a measured quantity therefrom by gravity to the coffee brewing chambers, together with means for heating the water and maintaining predetermined temperatures and safety controls, comprises the primary object of the invention.

Figure 3:
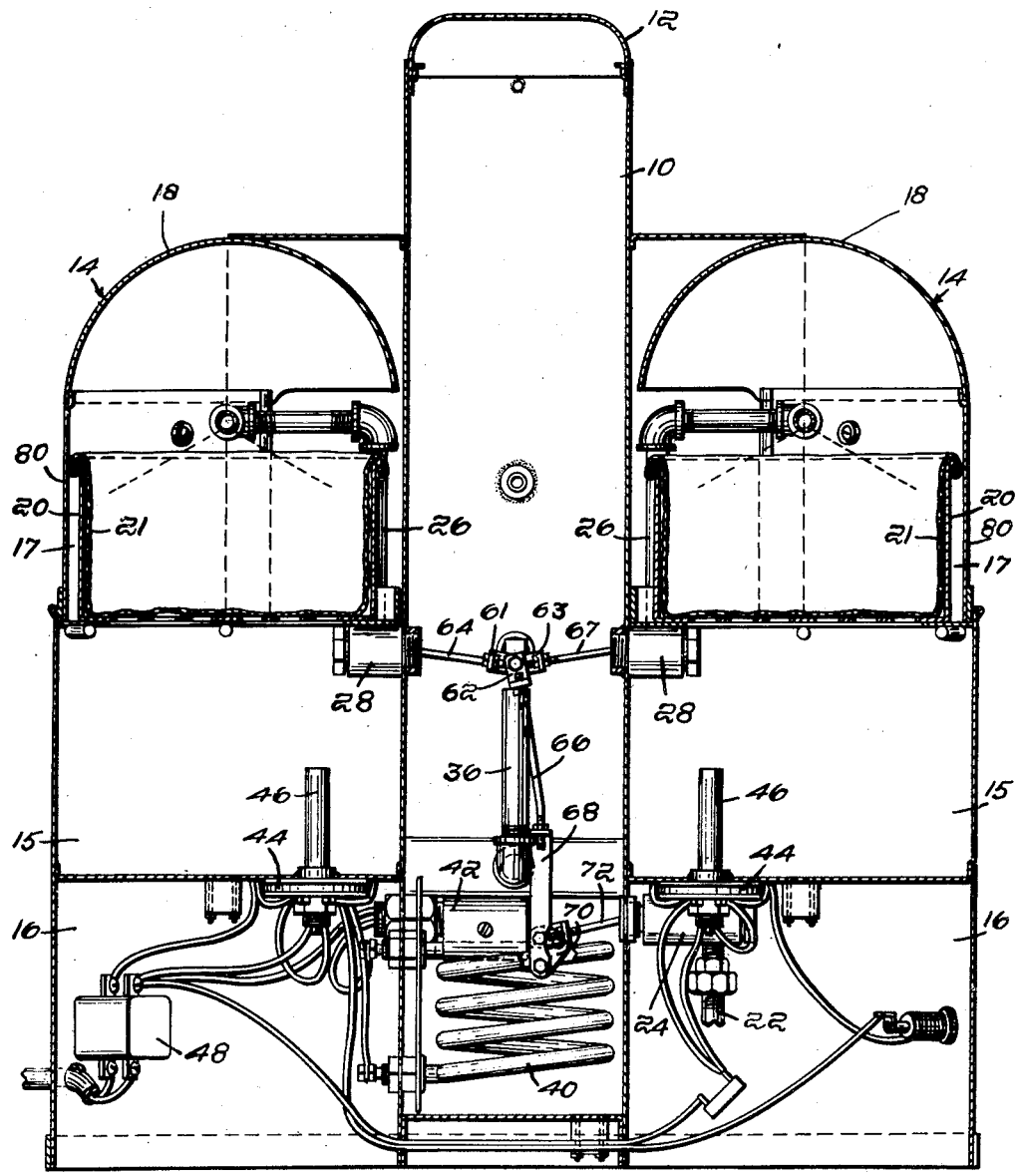
Figure 5:
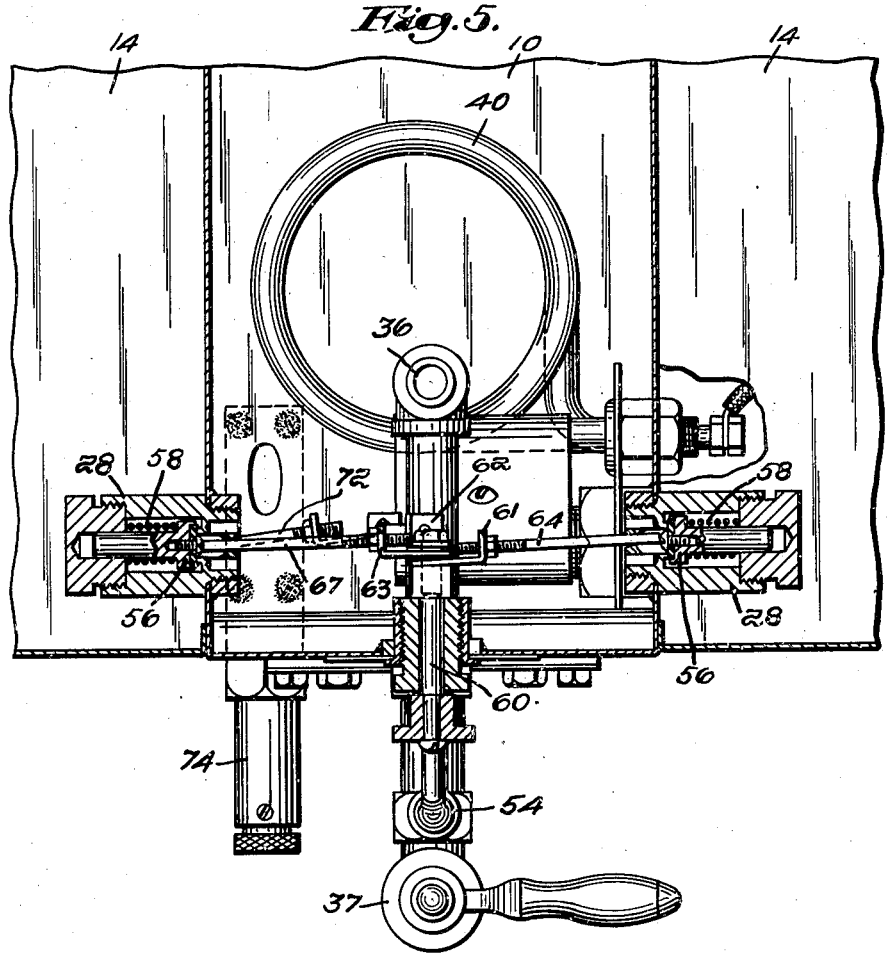
Figure 6:
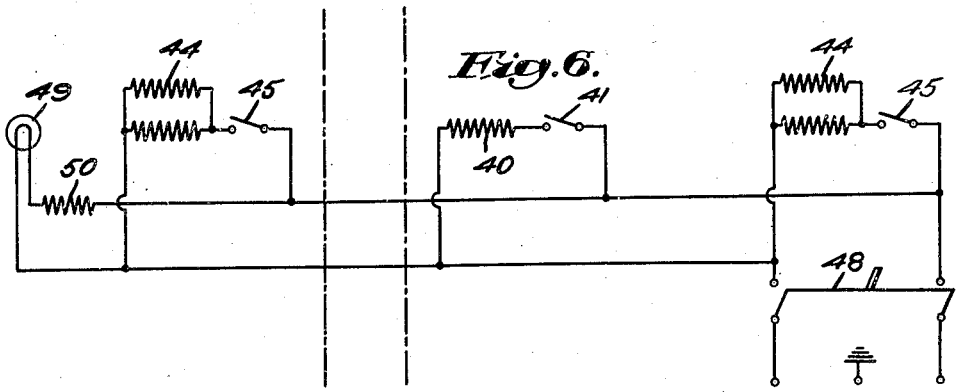

These and other features of the invention will be best understood and appreciated from the following description of a preferred embodiment thereof selected for purposes of illustration and shown in the accompanying drawings in which, Fig. 1 is a view in front elevation of an improved coffee making apparatus embodying my invention, Fig. 2 is a plan view thereof, Fig. 3 is a vertical sectional view taken on line 3—3 of Fig. 2, as seen from the rear of the apparatus, Fig. 4 is a plan section taken on line 4—4 of Fig. 1, Fig. 5 is a fragmentary plan section taken on line 5—5 of Fig. 1 and Fig. 6 is a diagrammatic view of the electric wiring connections.

The apparatus as illustrated comprises a housing having centrally located therein an elongated and vertically disposed water supply reservoir 10 consisting of a single water chamber therein provided with a top cover 12. Two coffee brewing units 14 are disposed respectively at opposite sides of the reservoir. Each unit includes a brewed coffee reservoir 15, a housing chamber 16 therebeneath, a coffee brewing chamber 17 above the reservoir 15 and a fixed top cover 18. A container 20 for holding the ground coffee in a bag 21 is provided in the brewing chamber 17. The reservoir 10 and units 14 are constructed and arranged to present a single housing as illustrated in Fig. 1 and a minimum number of simple controlling elements are provided thereon.

Water is supplied to the reservoir 10 from a service main through a pipe 22 including a controlling valve 24 (see Fig. 3). Coffee brewing water is supplied to and sprayed onto the coffee in the containers 20 from piping 26 including valves 28, one for each unit 14. The valves 28 of this piping are tapped into an intermediate portion of the reservoir 10 substantially at the base of the chamber 17. Water can be raised to any desired level in the reservoir 10 and can be gauged from a gauge glass 30 tapped into the reservoir and having its sight portion extending upwardly from the level of the spraying portion of the piping 26. Gauge glasses 32 are provided for the coffee reservoirs 15 and coffee can be drawn from these reservoirs through piping at 34 controlled by hand valves 35. Water can be drawn from the reservoir 10 through piping 36 controlled by a hand valve 37.

The water and coffee are heated electrically and the circuit employed is illustrated diagrammatically in Fig. 6. This circuit includes a water heating coil 40 having a switch 41 automatically controlled by a thermostat 42. Each coffee reservoir 15 is likewise provided with heating coils 44 having switches 45 automatically controlled by thermostats 46 extending upwardly into the liquid in the reservoir. A main switch is provided at 48 and a pilot lamp 49 operating through a resistance coil 50 in the circuit indicates when the main switch 48 is closed and the apparatus is in operation. The thermostats operate automatically to maintain the desired temperatures of the coffee in the reservoirs and also to open the switches should the liquid fall below a predetermined safe level.

The valves 24 and 28 are preferably identical, as illustrated, and are preferably operated from a single controlling handle 54. Each valve includes a closure plunger 56 normally held in closed position by a spring 58 which pushes each plunger inwardly to hold it seated. The handle 54 is connected to a shaft 60 extending horizontally into the reservoir 10 and rotatable about its horizontal axis. The shaft 60 is in effect a crank shaft and on the crank at its inner end are mounted three angle arms 61, 62, 63 disposed in diverging relation. The throw of the crank is short, for example $\tfrac{3}{16}$ of an inch, so that when the controlling handle 54 is moved 180° the three arms are bodily displaced about ⅜ of an inch but without any change in their angular position. To these arms are adjustably connected respectively links in the form of rods 64, 66 and 67. The angle arms 61 and 63 are disposed at opposite sides of the arm 62 and their rods extend to and have a lost-motion sliding fit with the plungers 56 of the valves 28. The rod 66 extends downwardly and is connected to a flat strap 68 which in turn is pivotally attached to a triangular rocker plate 70 mounted for pivotal movement. A rod 72 pivotally connected to the plate 70 extends horizontally to and is arranged to operate the valve 24 through a lost-motion sliding fit therewith.

When the handle 54 is in the position of Fig. 1 all valves 24 and 28 are closed. Rotation of the handle 180° therefrom to the "fill water" position is adapted to open the valve 24. Rotation of the handle 90° in one direction to one "make coffee" position is adapted to open one valve 28 and rotation of the handle 90° in the opposite direction to the "make coffee" position is adapted to open the other valve 28. Rotation of the handle 54 ninety degrees from the position of Fig. 1 does not affect opening of the valve 24 and rotation of the handle 180° from such position opens the valve 24 but leaves the valves 28 in closed position.

Coffee brewing apparatus as heretofore commonly constructed has been inconvenient in requiring the operator to supply fresh charges of coffee to the top of the apparatus and this has required an objectionable amount of climbing and reaching. An important feature of my invention resides in the provision of conveniently arranged openings in the front or side of the casing giving direct access to the making chambers. As illustrated in Figs. 1 and 3, an opening is provided into each coffee brewing chamber 17 and is normally closed by a curved slide gate or door 80 provided with a handle 82. When coffee is to be brewed the operator merely opens the gate 80 and places the container 20 in brewing position. He moves the handle 54 to and leaves it in the "fill water" position until the desired level of water shows in the gauge glass 30 and thereafter, when the water has reached the required temperature, he moves the handle to the appropriate "make coffee" position for discharging the water on the ground coffee as illustrated in Fig. 3. The measured quantity of water located above the piping 26 thereupon flows by gravity through the piping and is sprayed onto the ground coffee above the coffee chamber 15.

It will be understood that each of the spring-closed valves 24 and 28 automatically closes by spring pressure and remains closed when permitted to do so. Any selected one of these valves may be opened by turning the handle 54 to the appropriate station and in so doing the connecting rod 64, 67 or 72 is rendered effective to open the appropriate valve against spring pressure. Meanwhile the connecting rods of the other valves are free to move, on account of their lost-motion with the valve, without disturbing its position. This feature of having each valve close automatically and independently when permitted to do so is important and of considerable practical value in apparatus of the kind herein disclosed.

It will be understood that when the controlling handle 54 is swung 90° upwardly toward the right, the arm 63 is carried toward the right and the plunger of the right hand valve 28 is forced outwardly from its seat by the rod 67. During this movement of the handle the rod 64 moves idly in the plunger of the left hand valve 28, and similarly the plunger of the valve 24 is left undisturbed. On the other hand, when the controlling handle 54 is swung into its upright position, the valve 24 is forced outwardly and opened while the two valves 28 remain closed. Either of the two valves 28 may be opened by swinging the controlling handle to the right or the left. In swinging the controlling handle into its upright position to open the valve 24, one or other of the valves 28 will be momentarily opened depending on the direction of movement of the handle, but this momentary opening of the valve 28 is not objectionable in using the apparatus.

Having thus disclosed my invention and described in detail an illustrative embodiment thereof, I claim as new and desire to secure by Letters Patent:

1. A coffee making apparatus, comprising a housing, a relatively tall water reservoir disposed vertically within the housing, two coffee making units within the housing adjacent to and at opposite sides of the reservoir, each of said units including a brewing chamber disposed below the top portion of the reservoir and adapted to receive and support therein a foraminous ground coffee holding container, piping tapped intermediately into the reservoir and providing a water spraying means over each brewing chamber, the housing having an opening through its side wall into each brewing chamber permitting the removal of said containers, a closure door for each such opening, piping for supplying water to the reservoir, and means for controlling the flow of water to the reservoir and the flow of water from the reservoir to the water spraying means.

2. A coffee making apparatus comprising a housing, an elongated vertically disposed reservoir within the housing, two coffee making units within the housing adjacent to and at opposite sides of the reservoir, each of said units including a brewing chamber disposed below the level of the upper portion of the reservoir and adapted to receive and support a container for ground coffee, piping connecting the reservoir with each of the brewing chambers and providing gravity flow of water thereto, spray outlets over each brewing chamber, the housing having openings into each chamber permitting the removal of said containers, a door for each such opening, piping for supplying water to the reservoir, and means for controlling the flow of water to the reservoir and the flow of water from the reservoir to the brewing chambers.

RICHARD C. ASHENDEN, Jr.

REFERENCES CITED

The following references are of record in the file of this patent:

UNITED STATES PATENTS

| Number | Name | Date |
|---|---|---|
| 855,702 | Goddard | June 4, 1907 |
| 1,268,858 | Lewis | June 11, 1918 |
| 1,385,593 | Strohbach | July 26, 1921 |
| 1,980,931 | Rothemel | Nov. 13, 1934 |
| 2,014,325 | Grilli | Sept. 10, 1935 |

FOREIGN PATENTS

| Number | Country | Date |
|---|---|---|
| 289,689 | Great Britain | May 3, 1928 |
| 593,547 | France | May 29, 1925 |
| 649,553 | France | Sept. 3, 1928 |